Patented Feb. 23, 1926.

1,574,406

UNITED STATES PATENT OFFICE.

GUSTAF A. NELSON, OF NEW YORK, N. Y.

COMPOSITION FOR CLEANING STONE.

No Drawing.　　　Application filed June 12, 1923.　Serial No. 644,944.

*To all whom it may concern:*

Be it known that I, GUSTAF A. NELSON, citizen of the United States, and resident of New York, in the county of New York and State of New York, have invented certain new and useful Improvements in Composition for Cleaning Stone, of which the following is a specification.

This invention relates to composition matter in general and particularly to a cleansing compound for stone, marble, tile and similar material.

The object of my invention is to provide a simple, effective and inexpensive composition for cleaning tombstones, granite faces of buildings and marble and stone articles of various kinds, and tile, which may be readily prepared and applied, and which will be very effective in cleansing and bleaching such articles.

While I have made various experiments, the most effective composition I have found comprises an ammonium compound of fluoride and hydro-chloride, mixed with a certain portion of oxalic acid and carbonate of sodium, which ingredients when compounded in proper proportions are mixed with a certain quantity of water and are applied to the surface to be cleaned or bleached.

I have found that very good results are also obtainable when the carbonate of sodium is omitted and a composition of ammonium fluoride and oxalic acid is employed.

The best results in the latter composition were found to be obtainable by mixing 95% technical ammonium fluoride with 5% oxalic acid to the quantity of about one and a half pounds, which is mixed with approximately one gallon of water.

When carbonate of sodium is employed the composition is about as follows, 75% technical ammonium fluoride, 10% oxalic acid, 15% carbonate of sodium, mixed to the weight of about one and a half pounds, which is dissolved in one gallon of water.

This composition is applied to the surface of the article to be cleansed and permitted to adhere thereto and then washed off with pure water.

It is preferable, when applying the composition to rub the surface with either a rag saturated with the compound or with a brush, so as to reach the crevices in the surface.

In order to give the surface of the cleaned article a glossy appearance, the same may be smoothened with pulverized pumice stone or any other polishing material. Hereafter the composition may be again applied and rinsed with water.

This cleansing process may be repeated until the desired degree of bleaching is obtained.

While I have mentioned a certain proportion of each ingredient, be it understood that such proportions may be varied when stronger or weaker compounds are desired.

Having thus described my invention, I claim:

1. A composition of matter for cleansing granite, stone, marble, tile, etc., composed of technical ammonium fluoride, oxalic acid and water.

2. A composition of matter for cleansing granite, stone, marble, tile, etc., composed of technical ammonium fluoride, oxalic acid as a negative agent, and carbonate of sodium, as a positive agent, mixed with water.

3. A composition of matter for cleansing granite, stone, marble, tile, etc., composed of 95% technical ammonium fluoride, 5% oxalic acid compounded to about the weight of 1½ lbs. and mixed with about one gallon of water.

Signed at New York, in the county of New York and State of New York, this 8th day of June A. D. 1923.

GUSTAF A. NELSON.